Figure 25:
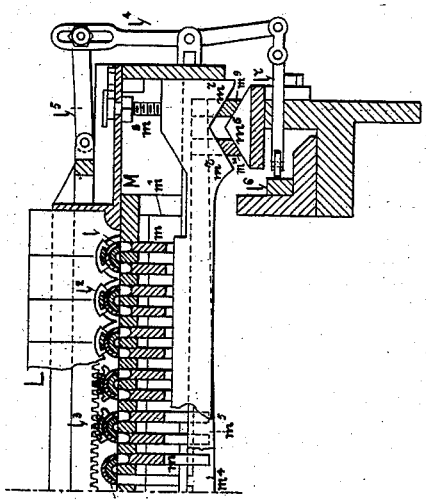

(No Model.) 13 Sheets—Sheet 1.
E. A. KJÖLLERFELDT & W. KOLNOTSCH.
CIGARETTE MACHINE.
No. 393,650. Patented Nov. 27, 1888.
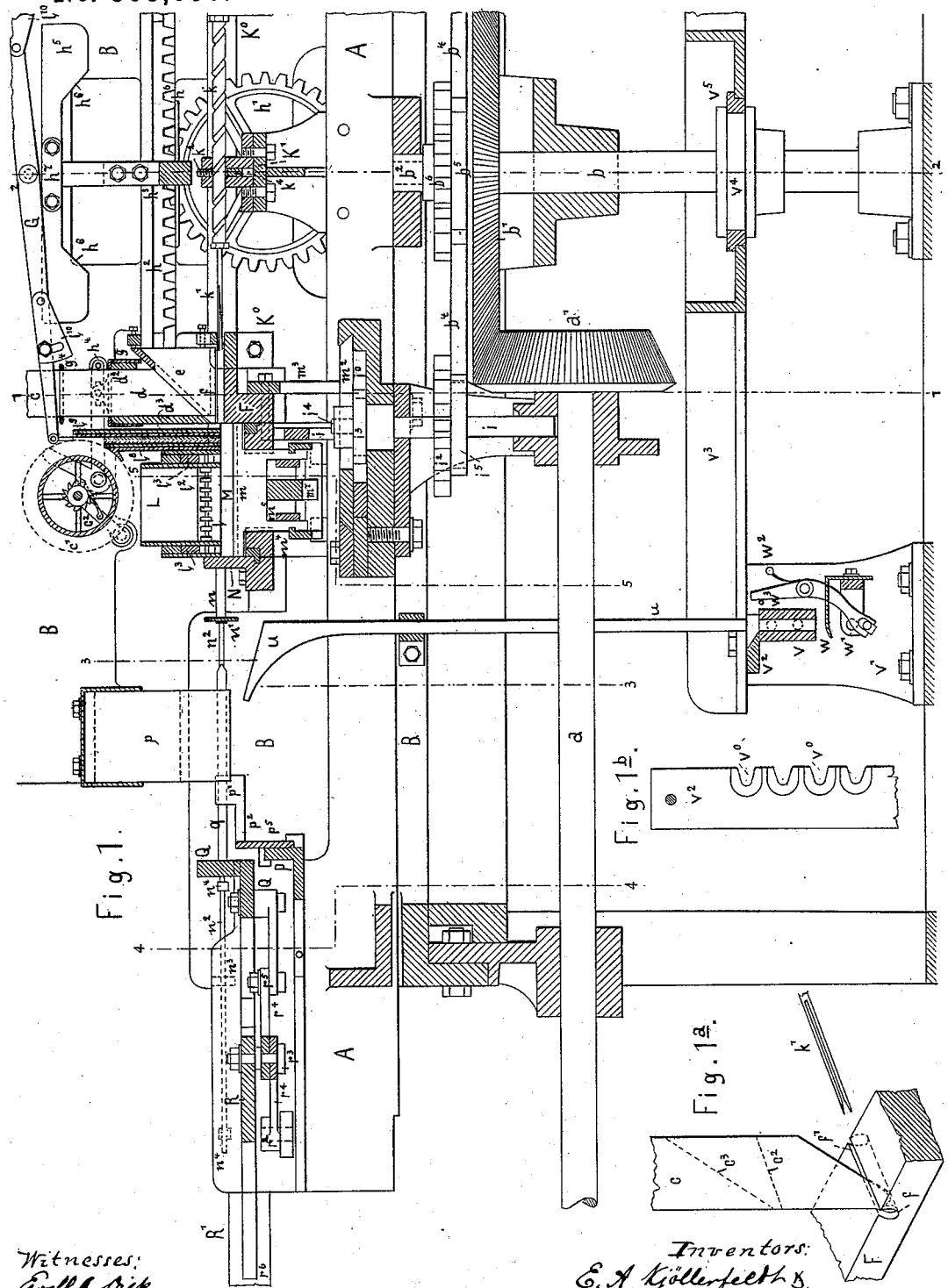

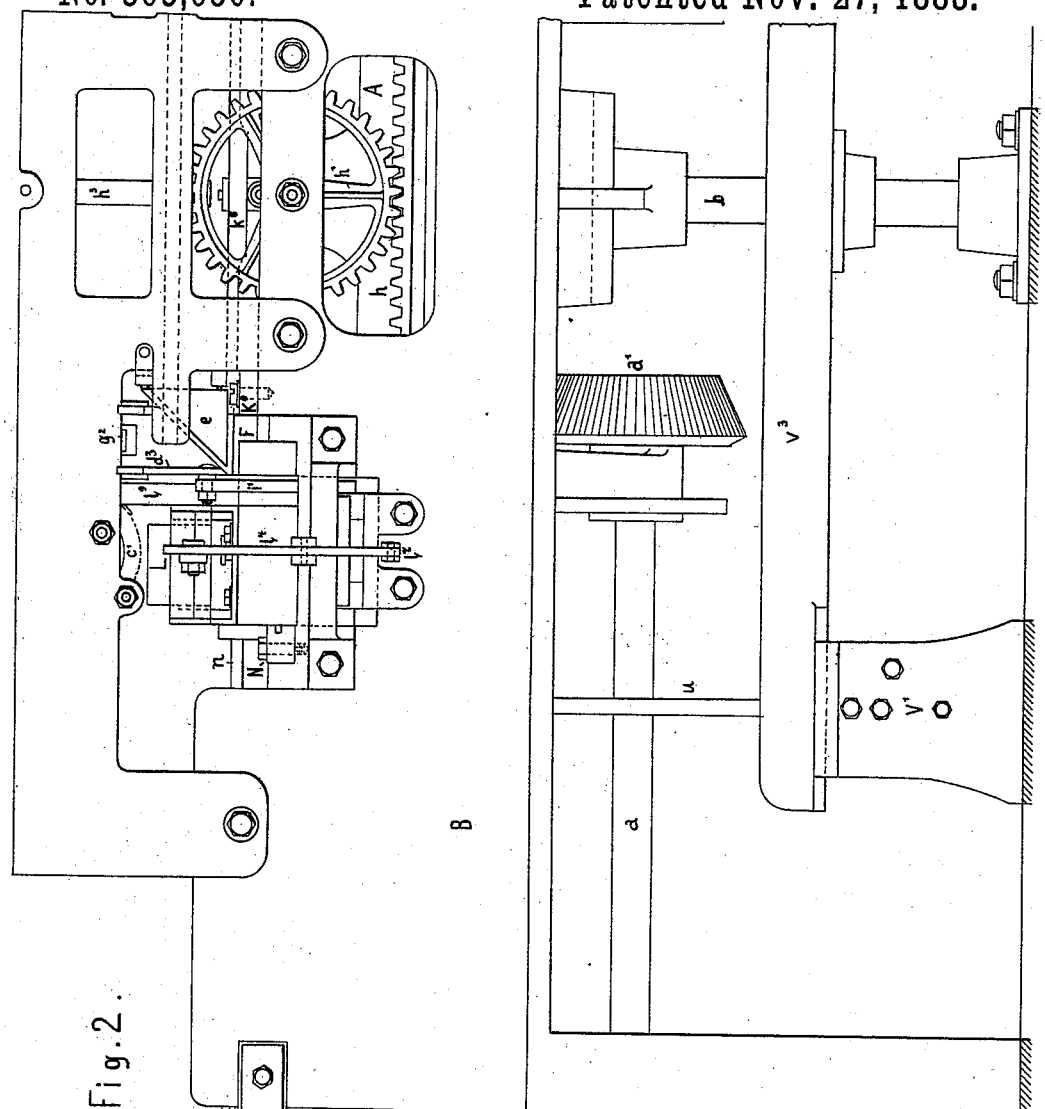

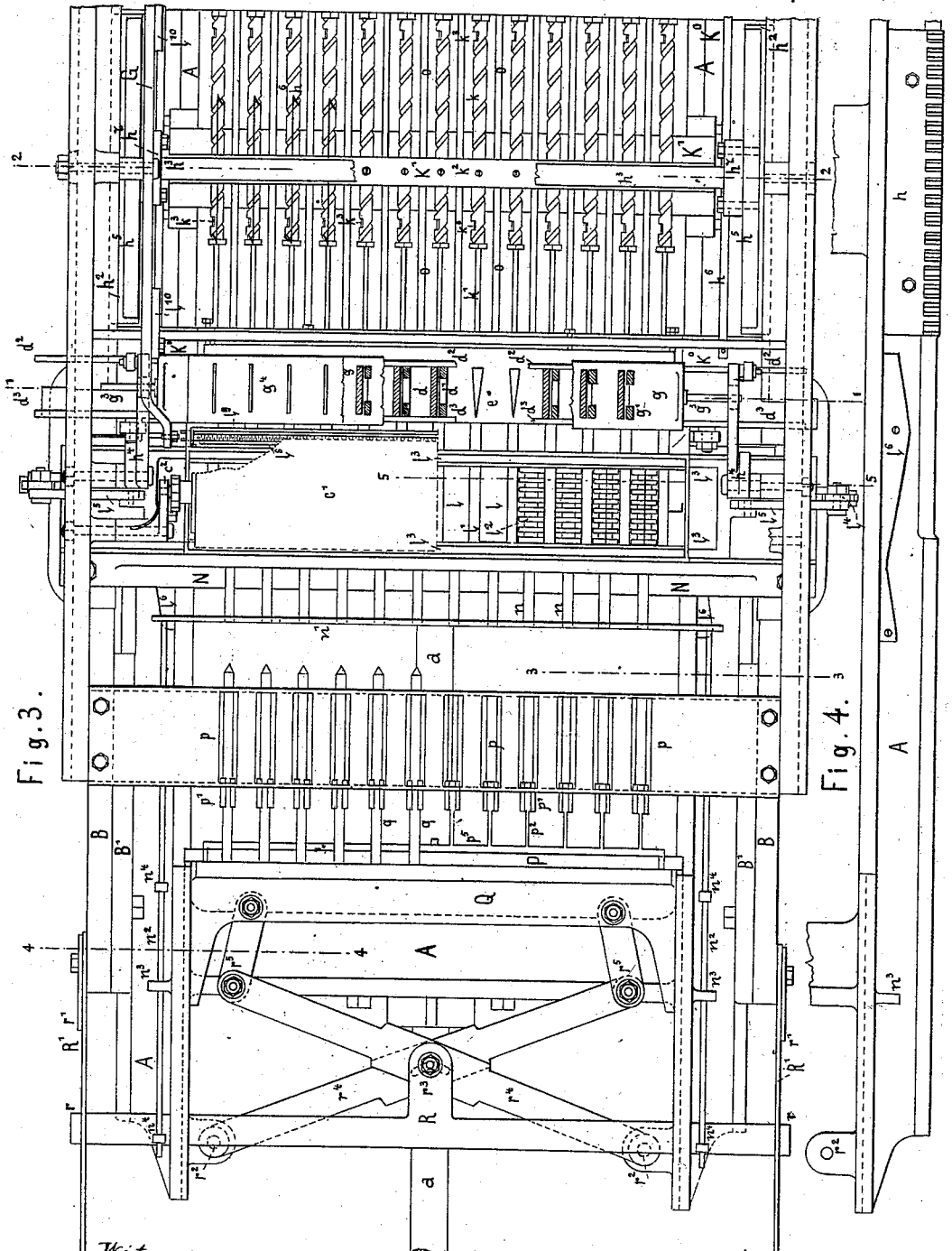

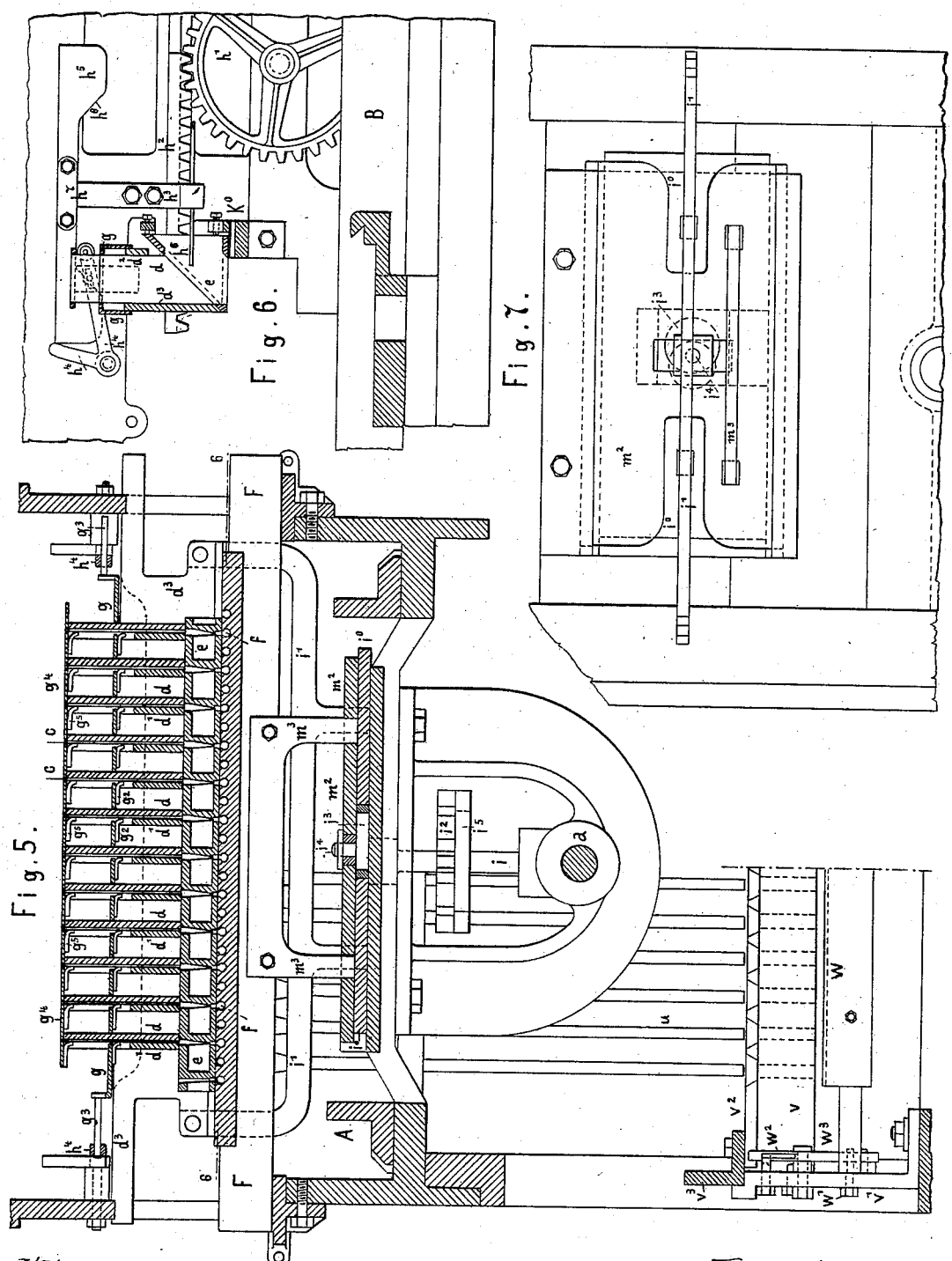

(No Model.) 13 Sheets—Sheet 5.
E. A. KJÖLLERFELDT & W. KOLNOTSCH.
CIGARETTE MACHINE.
No. 393,650. Patented Nov. 27, 1888.
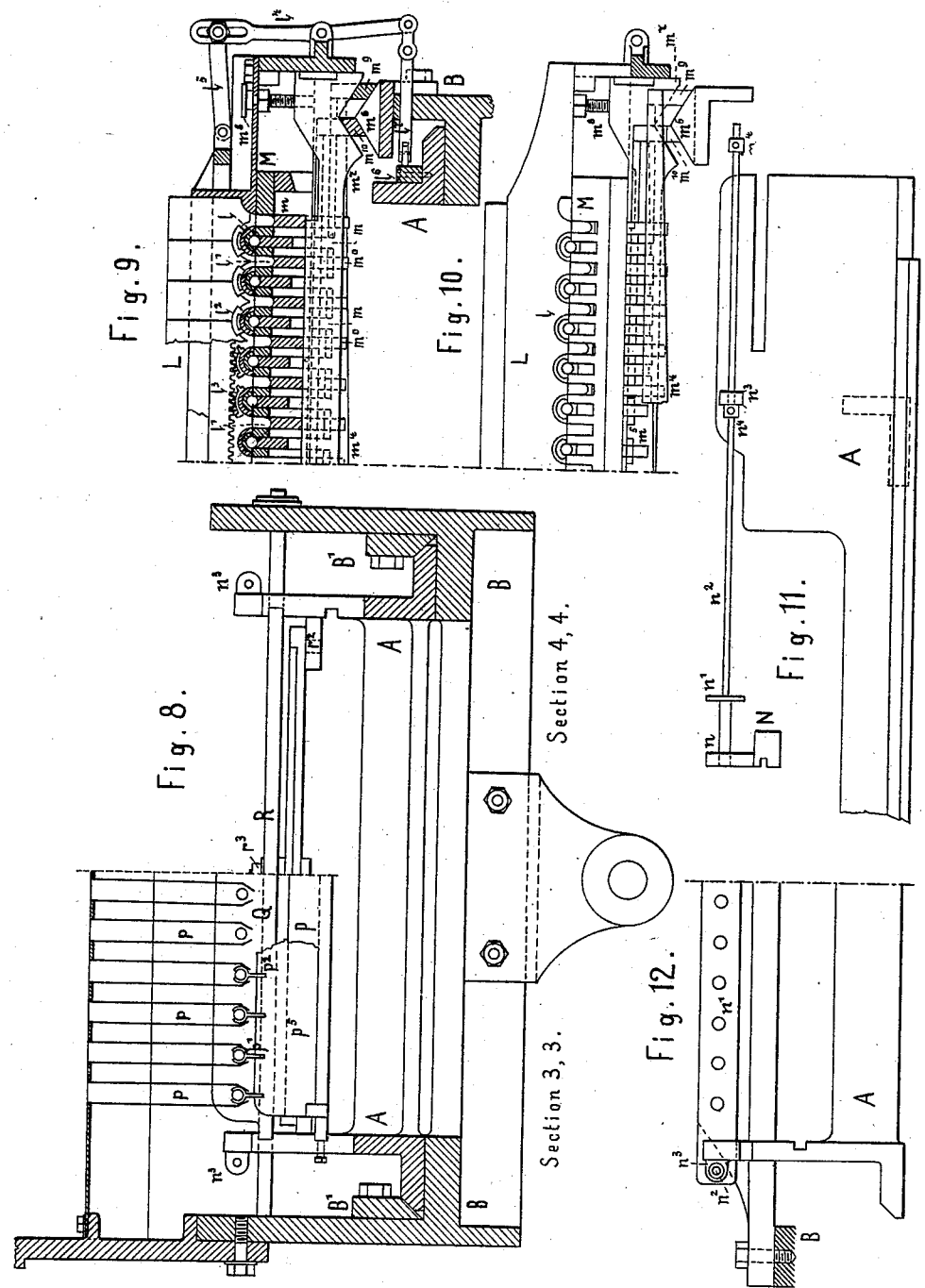

(No Model.) 13 Sheets—Sheet 6.
E. A. KJÖLLERFELDT & W. KOLNOTSCH.
CIGARETTE MACHINE.
No. 393,650. Patented Nov. 27, 1888.
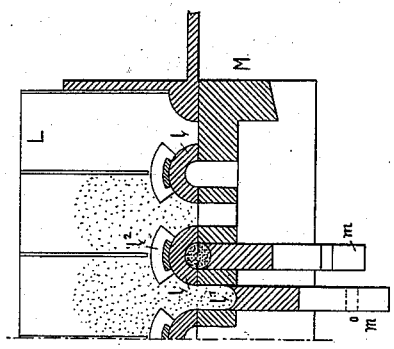
Fig. 10ᵇ.
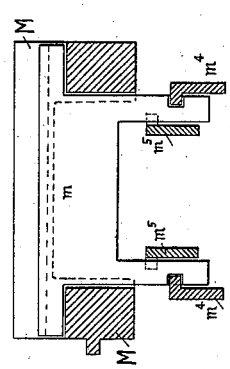
Fig. 10ᶜ.
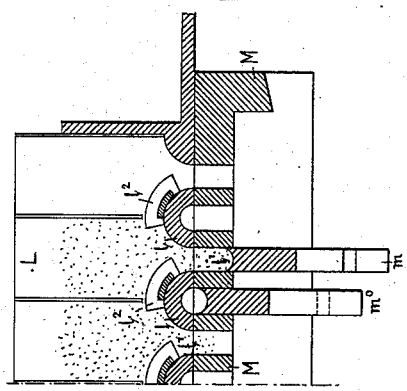
Fig. 10ᵃ.
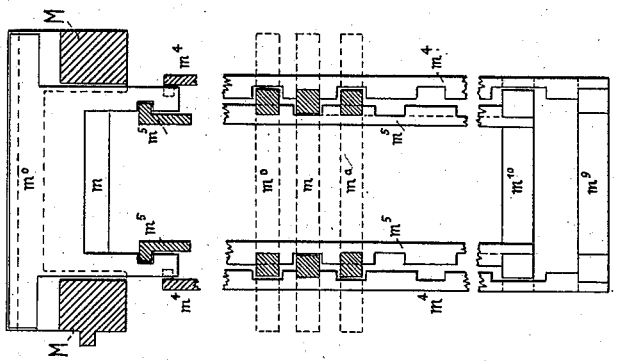
Fig. 10ᵈ.
Fig. 10ᵉ.
Witnesses:
Evella Dick
Marvin A. ...
Inventors:
E. A. Kjöllerfeldt
Wladislaw Kolnotsch
by Marcellus Bailey
their attorney

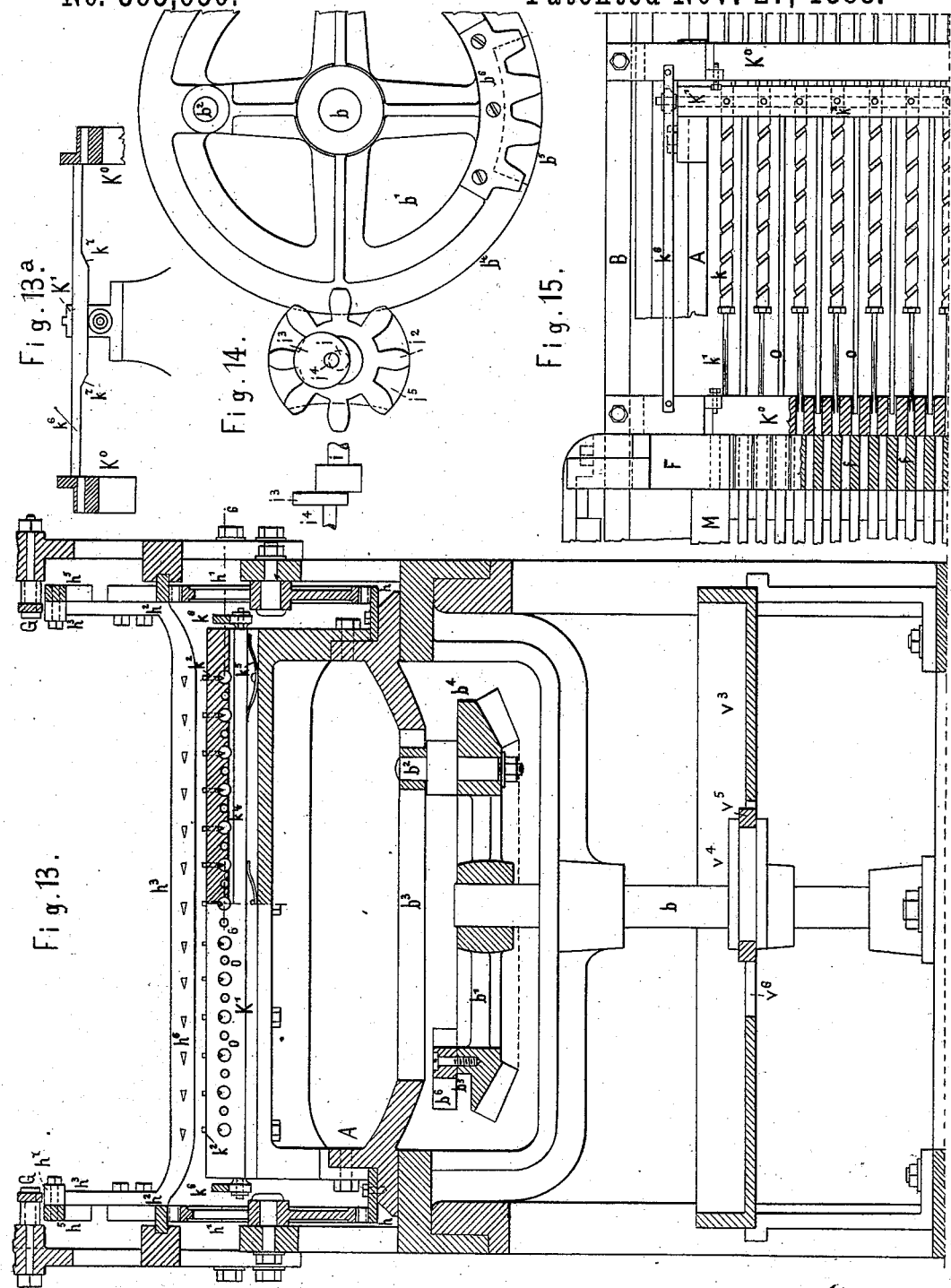

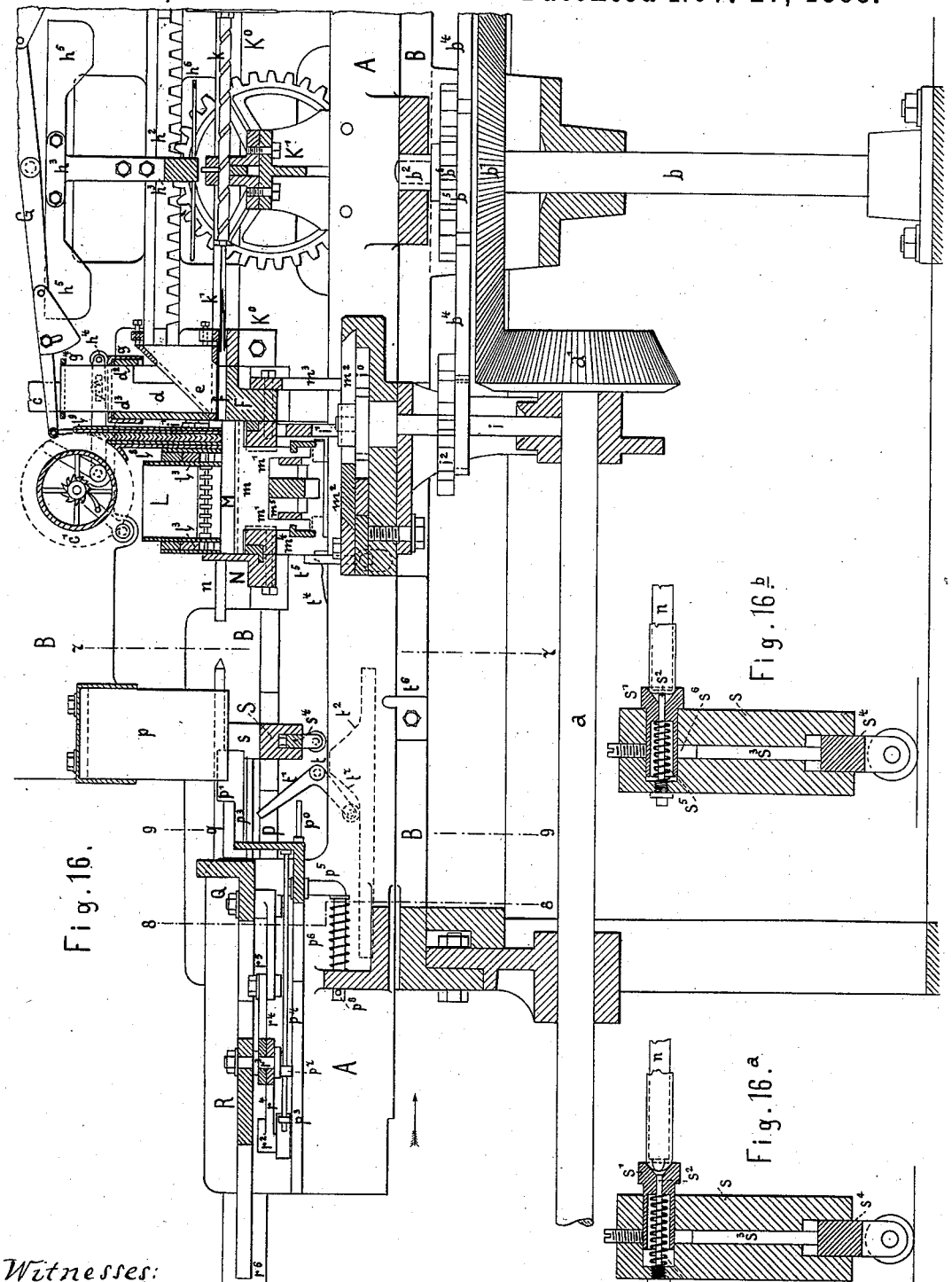

(No Model.) 13 Sheets—Sheet 9.
E. A. KJÖLLERFELDT & W. KOLNOTSCH.
CIGARETTE MACHINE.
No. 393,650. Patented Nov. 27, 1888.
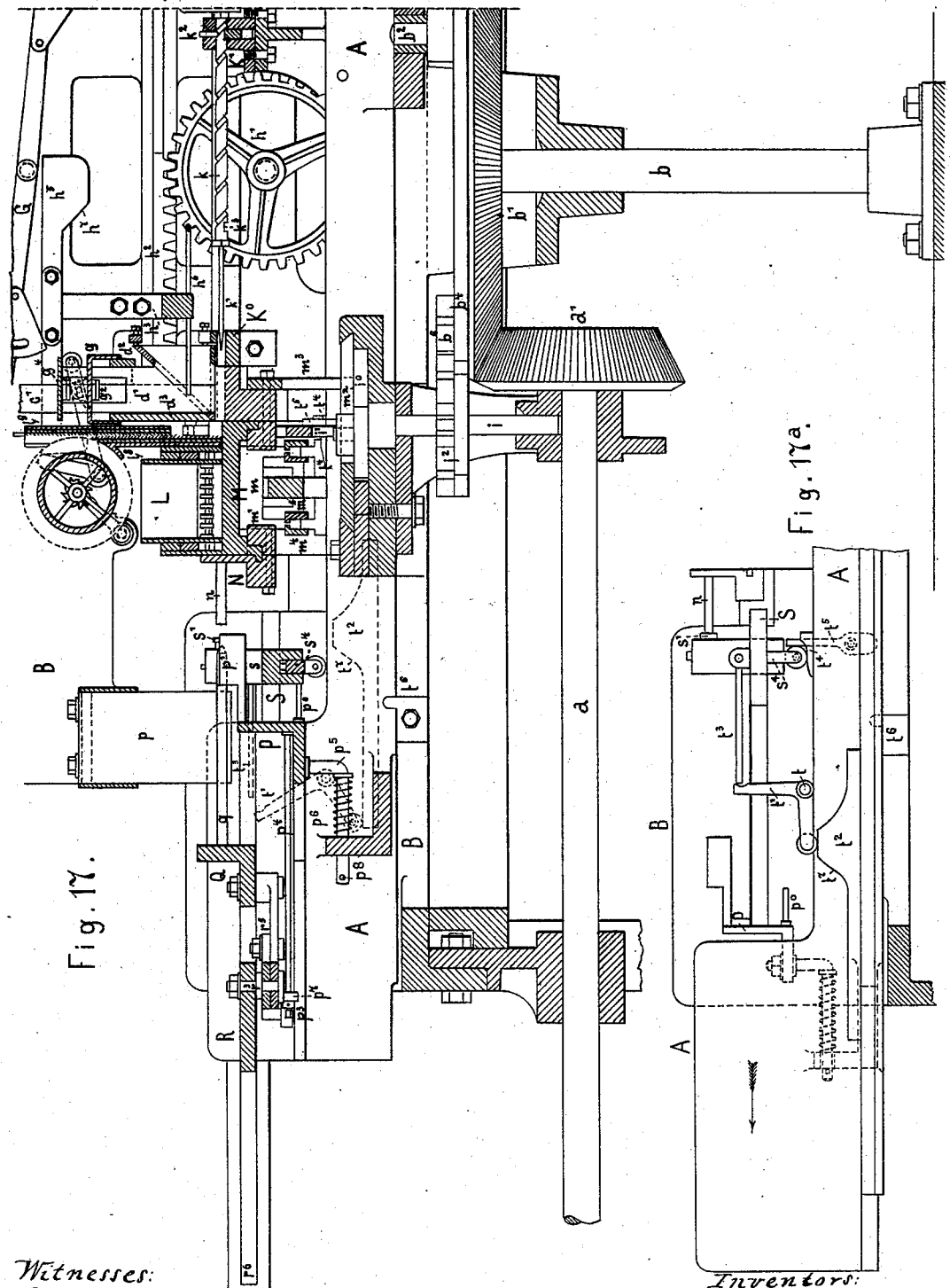

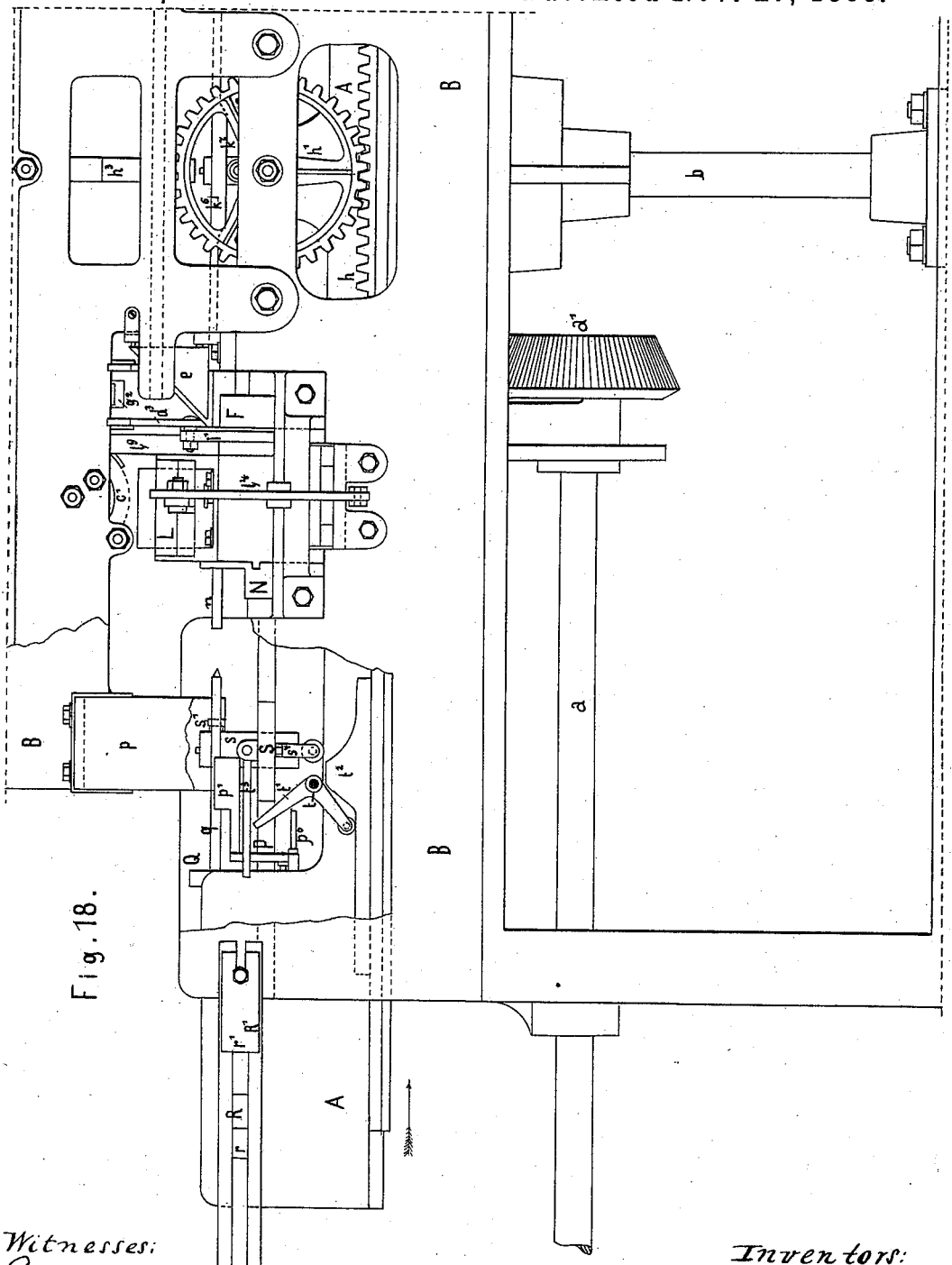

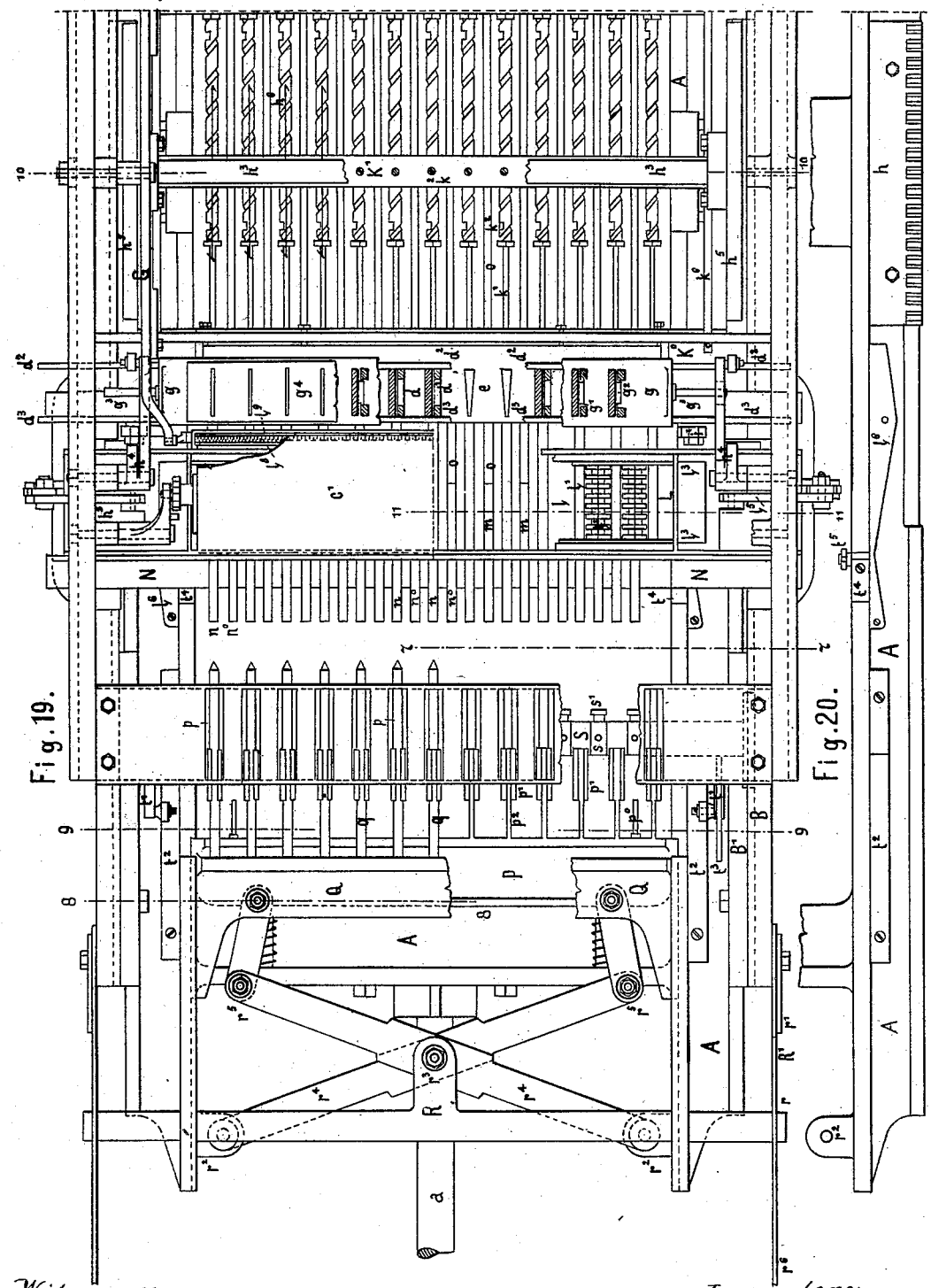

(No Model.) 13 Sheets—Sheet 12.
E. A. KJÖLLERFELDT & W. KOLNOTSCH.
CIGARETTE MACHINE.
No. 393,650. Patented Nov. 27, 1888.
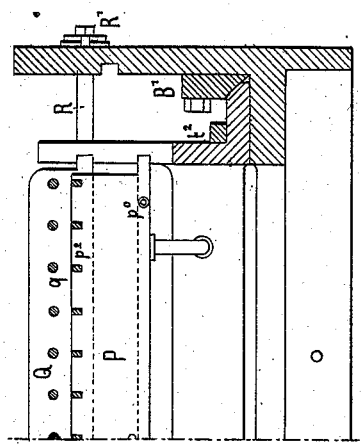
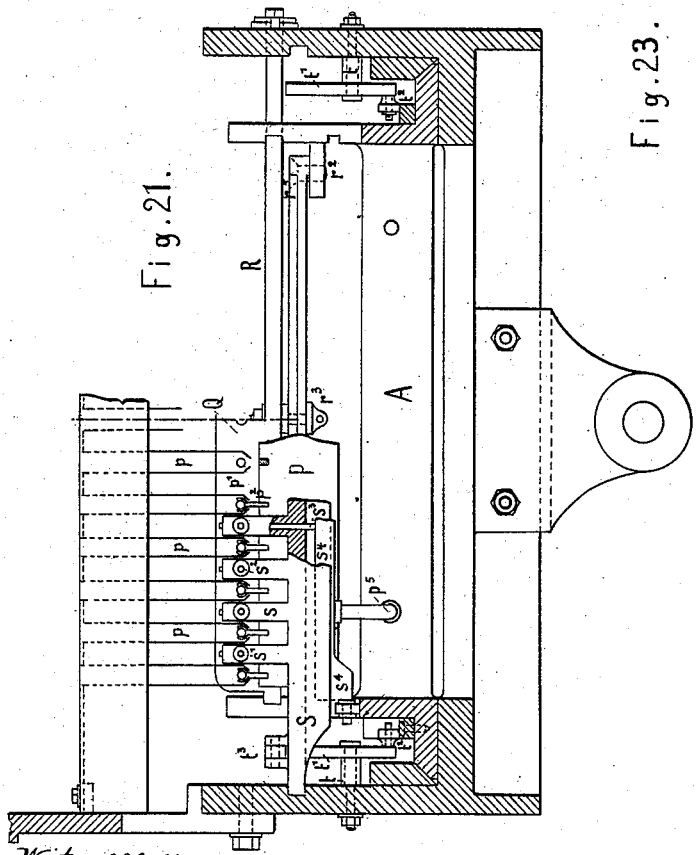
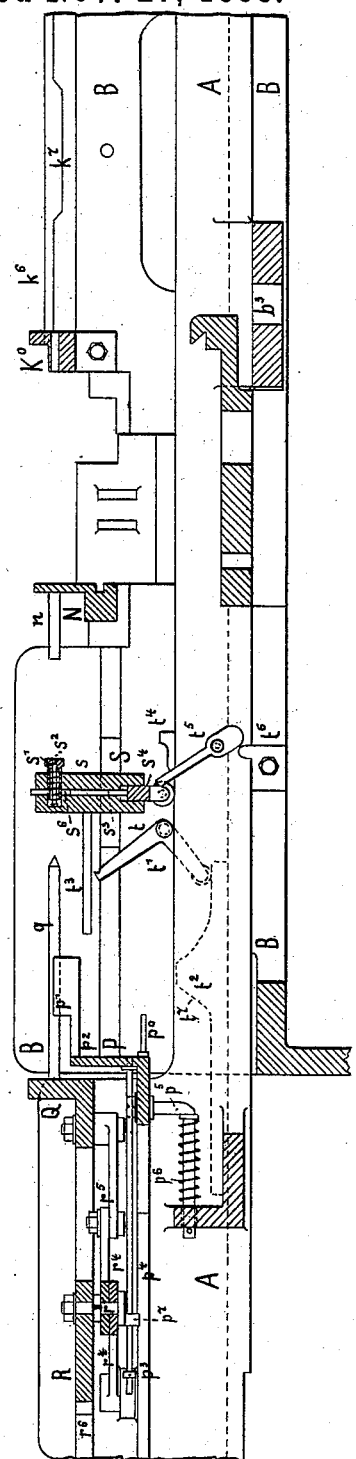

(No Model.) 13 Sheets—Sheet 13.

E. A. KJÖLLERFELDT & W. KOLNOTSCH.
CIGARETTE MACHINE.

No. 393,650. Patented Nov. 27, 1888.

UNITED STATES PATENT OFFICE.

EMIL ARMAND KJÖLLERFELDT AND WLADISLAV KOLNOTSCH, OF HELSINGFORS, FINLAND, RUSSIA.

CIGARETTE-MACHINE.

SPECIFICATION forming part of Letters Patent No. 393,650, dated November 27, 1888.

Application filed April 2, 1888. Serial No. 269,257. (No model.) Patented in Germany September 30, 1887, No. 43,089, and in England October 30, 1888, No. 4,459.

*To all whom it may concern:*

Be it known that we, EMIL ARMAND KJÖLLERFELDT and WLADISLAV KOLNOTSCH, both subjects of the Emperor of Russia, and residing at Helsingfors, Grand Duchy of Finland, Russia, have invented new and useful Improvements in Machines for Making Cigarettes, (for which we have received Letters Patent in Germany, No. 43,089, dated September 30, 1887, and in England, No. 4,459, dated October 30, 1888,) whereof the following is a specification.

Our invention relates to the manufacture of cigarettes on an extensive scale; and it consists in the construction of a machine operating to simultaneously provide a number of previously-prepared paper tubes with mouth-pieces of stronger paper, to fill them with tobacco, to introduce a plug of cotton between the mouth piece and the tobacco, to cut off projecting fibers of the latter, and to close the ends of the tubes. More especially the different operations required for this purpose are the following:

A, making the mouth-pieces: $a$, feeding into the machine strips of paper; $b$, cutting off pieces of trapezium-like form; $c$, coiling these pieces up into scrolls.

B, formation of the fillers: $a$, introducing the requisite quantity of tobacco into suitable molds; $b$, compressing the same.

C, conveyance of the paper tubes into the position for being filled: $a$, insertion of conducting-pins; $b$, pushing the tubes on filling-tubes.

D, introduction of cotton between the mouth-pieces and the fillers and forming plugs thereof.

E, introduction of the fillers, the cotton plugs, and the mouth-pieces into the paper tubes and simultaneous removal of the said tubes from the filling-tubes.

F, trimming the cigarettes in case they are filled with fibrous or cut tobacco.

G, closing the ends of the tubes if they are filled with comminuted tobacco.

On the annexed thirteen sheets of drawings is shown a little more than one-half of a double machine adapted for carrying out these operations, the portion omitted being alike to the corresponding portion appearing in the drawings, and both halves of the machine being driven by means of one central shaft.

Figure 26:
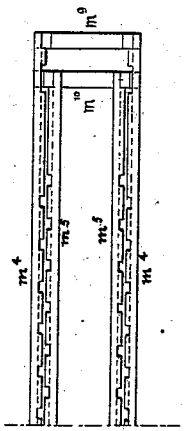
Figure 24:
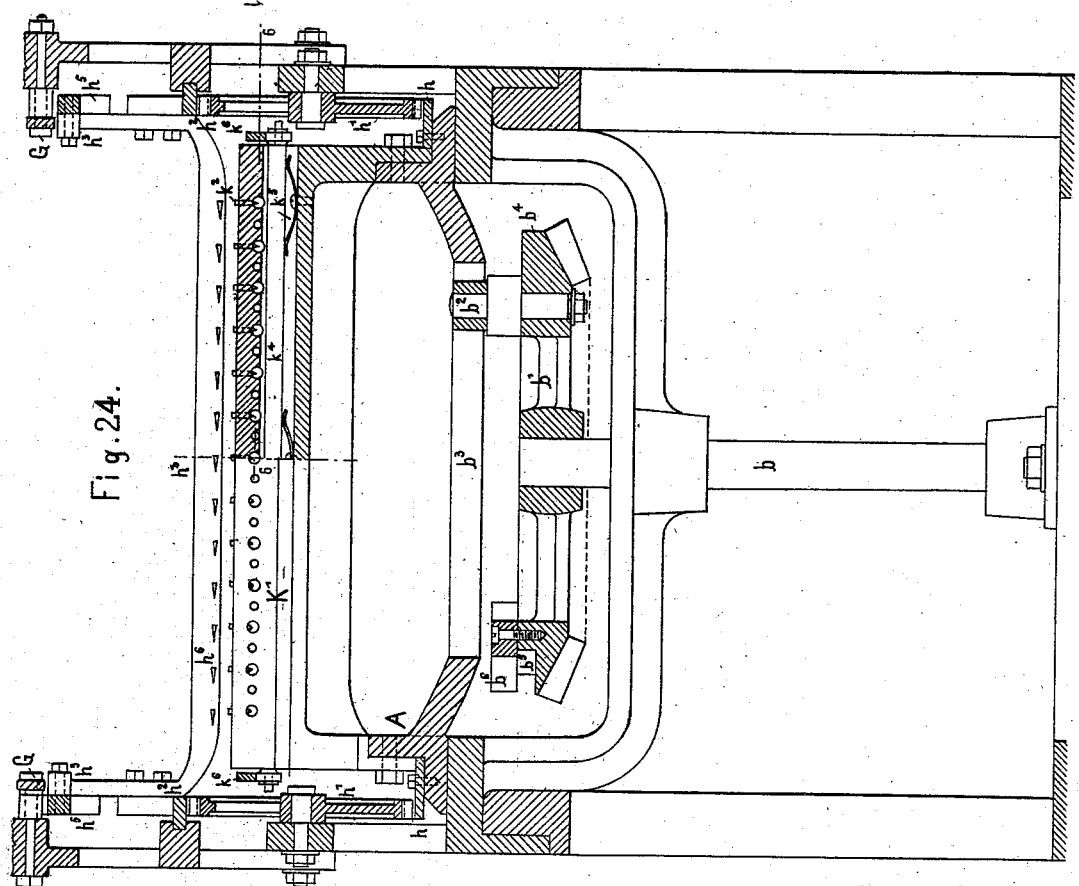

Figure 1 is a longitudinal vertical section along the center line of the machine for making cigarettes filled with cut tobacco, the sliding carriage A being in its central position and moving to the right. Fig. 1$^a$ is a perspective view illustrating the formation of the mouth-piece; Fig. 1$^b$, plan of a portion of a cutter, $v^2$; Fig. 2, side elevation, and Fig. 3 plan, partly in section, corresponding to Fig. 1; Fig. 4, portion of sliding carriage A; Fig. 5, transverse sectional view on line 1 1, Figs. 1 and 3, looking toward the left; Fig. 6, portion of the longitudinal section with the movable parts in a position differing from that shown in Fig. 1; Fig. 7, plan of slides connected with the driving mechanism; Fig. 8, sectional view, partly on line 3 3 and partly on line 4 4, Figs. 1 and 3, looking to the left; Fig. 9, sectional view on line 5 5, Figs. 1 and 3, looking to the left; Fig. 10, outside view of the parts shown in section by Fig. 9; Figs. 10$^a$ to 10$^e$, detail views of parts shown in Figs. 9 and 10 drawn to a larger scale, to be more fully described hereinafter; Fig. 11, rear view of a portion of the mechanism whereby during the filling operation the paper tubes are drawn off the filling-tubes; Fig. 12, half end view corresponding to Fig. 11; Fig. 13, transverse section on line 2 2, Figs. 1 and 3; Fig. 13$^a$, a cam-piece, hereinafter specifically referred to, and parts in relation therewith; Fig. 14, plan of the driving mechanism; Fig. 15, portion of sectional plan on line 6, Figs. 5 and 13, the sliding carriage A being shown in its extreme position to the right; Fig. 16, longitudinal section along the center line of the machine, provided with the tube-closing device required in making cigarettes filled with comminuted tobacco, the trimming device being omitted. In this figure the sliding carriage is in its central position and moving to the right, as in Fig. 1; Figs. 16$^a$ and 16$^b$, main parts of tube-closing device in two different positions; Fig. 17, section alike to Fig. 16, but with the carriage in its extreme position to the right; Fig. 17$^a$, sectional view of the tube-closing device, with position of parts while the carriage is moving to the left; Fig. 18, side view corresponding to Fig. 16, a portion of the frame being broken away; Fig. 19, plan corresponding to Fig. 16, some parts being broken away and others shown in section; Fig. 20, part of sliding carriage A; Fig. 21, transverse sectional view on lines 7 and 8, Figs. 16 and 19, looking to the left; Fig. 22, half transverse section on line 9, Figs. 16 and 19; Fig. 23, sectional view along center line of machine, showing mainly the tube-closing device, the carriage being at the end of its course to the left; Fig. 24, transverse sectional view on line 10, Fig. 19; Fig. 25, sectional view on line 11, Fig. 19, the movable parts being in their medium position; Fig. 26, plan of parts appertaining to the mechanism shown by Fig. 25.

Referring to Figs. 1 to 15, B is the frame of the machine, and A a sliding carriage moving between guides B' and actuated by the shaft $a$ through the medium of the bevel-wheels $a'$ $b'$ and the crank-pin $b^2$, Figs. 1, 13, and 14, the said pin being provided with a roller and engaging in the transverse slot $b^3$ of the carriage.

*Making the mouth pieces.*—The mouth pieces consist in scrolls made out of pieces of strong paper of trapezium form. The principle upon which these scrolls are produced is shown by Fig. 1ª, in which $c$ is a strip of paper having a width equal to the length of the mouth-pieces, F a block having the perforation or hole $f$ slitted at $f'$, and $k'$ a bifurcated pin or fork. The strip $c$, cut slanting at its lower edge, is pushed or fed downward through the slit $f'$ into the hole $f$. At the same time the fork $k'$ is introduced into the hole $f$ in such position as that it will pass with its prongs on both sides of the strip $c$ and is thereupon rotated. The combined motion of the strip and the fork thus causes the lower portion of the strip to be coiled up and to form the scroll. The strip, having gone down until a line, $c^2$, thereof is flush with the top of the block F, is cut off on this line and simultaneously on the slanting line $c^3$, being the lower edge of the portion for the next strip, and the piece $c^2$ $c^3$ is removed and the fork $k'$ withdrawn. The means for producing these operations upon a number of strips $c$ at once is as follows: Above the block F, having a series of holes, $f$, is placed the stationary multiple cutting device $e$, Figs. 1, 3, 5, and 6, and above this the strip feeding apparatus, both the device $e$ and the said apparatus being movable in the direction of their own length, but transversely to the machine. The strip-feeding apparatus consists in two vertical plates, $d^2$ $d^3$, and in the intermediate pairs of cross-plates, $d$ $d'$, projecting upward above the former, the plates of each pair being placed at such distance apart as to leave a passage for a strip, $c$, and to form the guides for the same. The instrument by which the strips are pushed downward consists in the vertically-movable plate $g$ or feeding-plate, being a kind of grate slipped from above upon the plates $d$ $d'$ and faced at the bottom with pieces of india-rubber, forming tongues $g^2$, Fig. 5, which project through slots in the plates $d'$ and bear with a downward bend against the plates $d$. To the top of the plates $d$ $d'$ is fixed a plate, $g'$, having slits corresponding with the spaces between the said plates, and provided with india-rubber tongues $g^5$, alike to those of the plate $g$. When the plate $g$ is raised, the tongues $g^2$ thereof slide upward along the strips $c$, which are retained in their position by the tongues $g^5$ of the plate $g'$; but when the plate $g$ is lowered it will, by means of its tongues $g^2$, move all the strips $c$ downward, the tongues $g^5$ presenting no obstacle to this motion.

The motion of the feeding-plate $g$ relatively to the plates $d$ $d'$ is brought about by two elbow-levers, $h^4$, having horizontal arms, with which the plate $g$ is in engagement by means of the two pins $g^3$ and upright arms operated upon by the pieces $h^5$, the latter being secured by the bars $h^3$ (see Fig. 13) to the two racks $h^2$, which gear with the spur-wheels $h'$, actuated by the racks $h$, Figs. 2 and 13, fixed to the sliding carriage A. The racks $h^2$ thus moving in a direction opposed to that of the carriage, the plate $g$ will be raised when the carriage moves to the right, (relatively to the figures.) For pushing the plate $g$ down, the pieces $h^5$ are provided with the inclined edges $h^6$, acting during the backward motion of the said pieces from above on rollers at the ends of the horizontal arms of the levers $h^4$. The feeding of the strips of paper thus takes place while the carriage A moves to the left. Simultaneously with this motion of the carriage and the feeding of the strips $c$ the forks $k'$ come into operation. These are fixed to both ends of spindles $k$, (see Fig. 15,) and they are guided during their longitudinal motion and rotate in holes drilled through the two stationary bars K⁰. The spindles $k$ are of such length that when being pushed against the right-hand bar K⁰ the forks at the left-hand end of the spindles will project into the holes of the left-hand bar K⁰ only, but not into the holes $f$ of the adjoining block F, whereas when they are pushed to the left the left-hand forks will pass into the holes of the corresponding block F for forming the mouth-piece from the scrolls.

The longitudinal and the rotative motions of the spindles $k$ are brought about by the bar K', Figs. 1, 3, 13, 15, fixed to the carriage A, the said bar having holes through which the spindles pass, and these being each provided with a helicoidal groove of large pitch, into which projects a pin, $k^2$, screwed from above into the bar. Moreover, each spindle has near either end a notch, $k^3$, Fig. 3, adapted to be engaged by the bar $k^4$, Figs. 1 and 13, located in a groove of the bar K' and pressed upward against the spindles by springs $k^5$. The notches $k^3$ have such position that when the bar $k^4$ is engaged therein the forks $k'$ will be in the proper position to pass with their branches on either side of the aforesaid strips $c$. Besides, when being thus engaged and moved together with the bar K', the said bar $k^4$ will carry the spindles along with it until they strike against the bar $K^0$ toward which the motion is directed. A moment before this the bar $k^4$ is disengaged from the notches by means of either of the two cam-edges $k^7$ of two fixed bars, $k^6$, Figs. 2, 13, and 13$^a$, acting on rollers at the ends of the bar $k^4$. The bar K', however, still moving on farther, now, by means of the pins $k^2$, produces the rotation of the spindles and the forks. If the bar K' is at the right-hand end of its course, as in Fig. 15, the bar $k^4$ is in engagement with the notches at the right-hand end of the spindles. On then moving to the left the bar $k^4$ carries along the spindles until the rollers at the ends of the bar strike against the right-hand cam-edges $k^7$ of the bars $k^6$, and the spindles touch against the left-hand bar $K^0$, whereupon the rotation of the spindles commences. When the bar K' arrives at the left-hand end of its course, the bar $k^4$ enters the notches $k^3$ at the left-hand end of the spindles and is then in the state to push them to the right.

Subsequent to the formation of the mouthpieces the scrolls have to be severed from the strips $c$ and the latter have to be cut off on the line $c^3$, Fig. 1$^a$, as described. For this purpose the lower ends of the plates $d$ $d'$ are made oblique in conformity to the said line $c^3$. The inner edges of these ends (i. e., the edges facing each other) and also the top edges of the slits $f$ in the block F are sharpened, so as to form cutters, and between the ends of the plates $d$ $d'$ and the block F are arranged the cutters $e$, consisting of triangular blocks united to form a trilateral transversely-slitted prism, the said prism being in close contact with the plates $d$ $d'$ and the block F and secured to the frame of the machine. It is evident that when the series of plates $d$ $d'$ and the block F are moved longitudinally to the said prism (or transversely to the machine) the required cutting operation will be performed in respect to all the strips $c$. This motion is brought about as follows: The plate $d^3$, to which the plates $d$ $d'$ are fixed, is rigidly connected by the piece $i'$, Figs. 1, 2, 5, and 7, to a slide, $i^0$, and the block F by the piece $m^3$ to a slide, $m^2$, and these slides, guided transversely to the machine, are operated, respectively, by the eccentric $i^3$ and the pin $i^4$, (see also Fig. 14,) integral with the shaft $i$ and engaging with the slides by means of slide-blocks in slots of the slides, so that each rotation of the said shaft produces a to and-fro motion of the two slides. The eccentric $i^3$ and the pin $i^4$ are placed both on the same side of the center line of the shaft $i$, in consequence whereof both slides are moved simultaneously. The throw of the eccentric $i^3$ is such that after every half-revolution of the shaft $i$ each pair of plates $d$ $d'$ will be shifted from one slit between the cutters $e$ to the other, so that each strip $c$ will pass alternately into one slit and its neighboring one, the number of slits between the cutters $e$ exceeding by one the number of pairs of plates $d$ $d'$. The throw of the pin $i^4$ is but one-half that of the eccentric $i^3$, the block F requiring to be moved to and fro by half the distance between the said slits only, as there are two holes $f$ to each slit, (or to each strip $c$,) the scrolls being formed in the alternate holes, according as the block F is in one extreme position or the other.

The shaft $i$ is rotated by half a revolution every time the sliding carriage is at the right-hand end of its course, (the forks $k'$, and also the driving-pins $o$, to be described hereinafter, being at this period withdrawn from the holes in the block F,) and these rotations are carried out quickly, while in the intervals between the rotations the shaft is kept locked in its position. For this purpose the said shaft $i$ is provided with the pinion $i^2$, Figs. 1, 5, and 14, and to the top of the wheel $b'$ is fixed, opposite to the crank-pin $b^2$, a toothed sector, $b^6$, Figs. 1, 13, and 14, having half as many teeth as the pinion. The top edge, $b^4$, of the wheel $b'$ is cylindrical, and in it there is below the sector $b^6$ a recess, $b^5$. On the other hand, the pinion $i^2$ has under its teeth a disk, $i^5$, which is cylindrical upon two portions opposite to each other and recessed between these portions, according to lines corresponding with the cylindrical edge $b^4$ of the wheel. During the greater part of its rotation the wheel $b'$ passes with its edge $b^4$ along either recess of the disk $i^5$, and thus prevents the pinion and the parts connected thereto from accidentally changing their position, whereas when the teeth of the sector $b^6$ come into gear with those of the pinion the cylindrical portion of the disk $i^5$, being below the operating-teeth of the pinion, passes into the recess $b^5$, and the pinion is free to rotate until it is again stopped by the edge $b^4$ of the wheel $b'$ engaging with the other recess of the disk $i^5$. At the time this operation goes on the bar $h^3$, forming a part of the described mechanism for pushing downward the strips $c$, is at the left-hand end of its course, as shown in Fig. 6. This bar carries, opposite to the slits between the cutters $e$, small sharp hooks $h^6$, (see also Figs. 3 and 13,) with resilient shafts, which at the end of their motion to the left pass into the slits between the cutters $e$ (these slits being made wider at the back) and catch the triangular waste pieces of paper cut out of the strips $c$. At the return motion of the bar $h^3$ the said pieces are then withdrawn by the hooks from between the cutters, and simultaneously the strips $c$ are moved down and the forks $k'$ caused to operate thereon, as hereinbefore described.

*Forming the fillers.*—The main parts of the devices serving for this purpose are shown by Figs. 10$^a$, 10$^b$, 10$^c$, 10$^d$, and 10$^e$. In Figs. 10$^a$ and 10$^b$, L are three of a series of stationary tobacco cases, the bottoms of which are formed by semi-cylindrical pieces $l$, arranged under the partition-walls of the cases and having each a semicircular cavity of the diameter desired for the finished filler. Between the neighboring pieces $l$ there are spaces having a width equal to the said diameter, and upon each of the pieces $l$ is placed a slide, $l^2$, or "feeder," having transverse ribs and moving in an arc of a circle from one side to the other. Below the cases and in contact therewith there is a slide, M, provided, in uniformity with the cavities of and the spaces between the pieces $l$, with slits, in which are vertically movable the plates $m$ and $m^0$, to be termed "compressors," the said compressors being semicircularly recessed at the top, so as to be adapted to form, together with the cavities in the pieces $l$, the molds for the fillers. In Fig. $10^a$ the compressor $m$ is at the bottom, leaving a space, $l'$, in the corresponding slit of the slide M, and into this space the contiguous slides $l^2$ or feeders, by repeated reciprocating motions, introduce a quantity of tobacco from the case L, being above the said space. Thereupon the slide M moves to the left, so as to fetch the space filled with tobacco under the cavity of the neighboring piece $l$, as in Fig. $10^b$, and the compressor $m$ rises, thereby pressing the tobacco above it into the required form, while the compressor $m^0$ descends. In this manner the alternate operations of filling the molds and compressing the tobacco are carried on with all the molds of the series. For producing the reciprocating circular motion of the feeders $l^2$ they are provided at both ends, which extend through the walls of the cases L, with teeth meshing with two racks, $l^3$, Figs. 3 and 9, united so as to form a frame. The said frame is connected by rods $l^5$ to levers $l^4$, Figs. 2, 3, and 9, operated through the medium of rods $l^7$, Fig. 9, by two cam-pieces, $l^6$, Figs. 4 and 9, fixed to either side of the carriage A. The slide M is actuated by means of the aforesaid block F, to which it is rigidly secured by screws, as shown in Fig. 1, and it is fixed thereto in such position that its slits are opposite to the holes $f$ of the said block and its top surface even with the center lines of the holes. The vertical motion of the compressors $m$ and $m^0$ is derived from the horizontal motion of the slide M by means of two pairs of bars, $m^4$ and $m^5$, Figs. 9, 10, $10^c$, $10^d$, and $10^e$, and by cam-pieces $m^6 m^7$, arranged at either side of the machine, the bars of each pair being connected together at both ends by the respective cross-pieces $m^9$ and $m^{10}$, so as to form therewith frames. The bars $m^4$ have lateral ribs or projections engaging with notches on the outer sides of two legs extending downward from the compressors $m$, while the bars $m^5$ engage in like manner with notches on the inner side of legs of the compressors $m^0$. On the other hand the ribs of the bars $m^4$ and $m^5$ are provided opposite to the legs of the compressors on which they are not to act in vertical direction with notches that allow these legs to pass through, but which engage them laterally. The two frames consisting of the bars and cross-pieces $m^4 m^9$ and $m^5 m^{10}$ are guided by their cross pieces, being engaged between the aforesaid cam-pieces $m^6$ and $m^7$, forming two inclined ways. When with this arrangement the slide M is shifted, together with the compressors, the latter will draw the frames $m^4 m^9$ and $m^5 m^{10}$ along with them, and the frames, being compelled to rise or descend, as the case may be, by the cam-pieces $m^6 m^7$, will produce the required vertical motion of the compressors. By means of screws $m^8$ the bar whose ends form the cam-pieces $m^7$ may be adjusted higher or lower. If it is raised, so as to leave some play to the cross-pieces $m^9$ and $m^{10}$, the compressors (which, besides, rest on the said bar when in their lowest position) will not descend as far as otherwise, and the fillers will become less compact. In Figs. 1 and 9 the slide M is shown composed of two parts; but this is immaterial in respect to its operation.

*Conveyance of the paper tubes into the position for being filled.*—For the reception of the paper cigarette tubes, prepared beforehand, receptacles $p$, Figs. 1, 3, and 8, are provided, consisting each of two sheet-metal plates having a space between them corresponding to the diameter of the tubes and bent inward at the bottom, but so as to leave a slit between their edges. These receptacles are so mounted on the bed B that the lowest one of the tubes contained therein will be in a line with the cavities of the half-cylindrical pieces $l$, constituting the upper half of the filler-molds. Into the said receptacles $p$ the tubes are introduced by hand or by an apparatus not forming any part of this invention. At every motion of the carriage to the right the paper tubes, being at the bottom of these receptacles $p$, are pushed upon filling-tubes fixed to the stationary bar N. For this purpose the machine is provided (for each cigarette to be made at a time) with two instruments—viz., a pointed guiding pin, $q$, and a tube-conveyor, $p'$, the latter being a small ring fitting on the pin $q$. These instruments are actuated in such manner that the pin $q$ first passes through the paper tube opposite to it and advances up to the mouth of the corresponding filling-tube $n$, thus forming a guide for the paper tube, and that thereupon the conveyer $p'$ pushes the said tube along on the pin $q$, and from the same upon the tube $n$, until it touches the movable plate or stripper $n'$, to be described hereinafter, which is at the time close to the bar N.

The pins $q$ are fixed to a transverse piece, the pin-carrier Q, Figs. 1, 3, and 8, which slides in guiding-ways on the carriage A. The said carrier is connected by means of links to two levers, $r^4$, crossing each other and pivoted by pins $r^2$ to the carriage. At their crossing-point the levers $r^4$ are connected by means of a pin, $r^3$, passing through elongated holes of the levers to a bar, R, projecting through slots in the carriage A and guided at its ends $r$ in slots of plates R', fixed to the frame B. The result of this arrangement is that when the carriage A moves to the right it will, by means of the pins $r^2$, levers $r^4$, and links $r^5$, push the carrier Q and the bar R forward in the same direction until the pins $q$ touch against the tubes $n$. The carrier is thereby stopped; but the pins $r^2$, moving onward with the carriage A, continue to act through the levers $r^4$ and the pin $r^3$ on the bar R and to advance it, the speed of the latter being, however, only about one-half that of the carriage, owing to the transmission of motion through the levers $r^4$, which now turn about the pins $r^5$. When the bar R strikes with its ends $r$ against the inner end surfaces, $r'$, of its guiding-slots in the plates R', the bar is stopped; but as the carriage still goes on farther the two levers $r^4$ will turn about the pin $r^3$ and draw the carrier Q to the left. In the position relatively to the carriage into which the latter thereby finally comes it remains during the motion of the carriage to the left thereupon following until the bar R reaches the ends $r^6$ of its guiding-slots. The bar then stops again together with the pin $r^3$, while the pins $r^2$, continuing to move with the carriage to the left, operate through the levers $r^4$ to push the carrier Q a certain distance to the right. At the next motion of the carriage to the right the described operation is repeated, the bar R remaining a while at rest at the end of each stroke of the carriage.

The tube-conveyers $p'$ are fixed by means of arms $p^2$, adapted to pass through the slits at the bottom of the tube-receptacles $p$ to a plate, $p^5$, and through the same to a carrier, P, engaging with its ends in grooves of the carriage A and secured thereto by screws, so that the conveyers partake of the motion of the carriage. The cigarette-tubes are thus pushed on the filling-tubes during the motion of the carriage to the right.

*Introduction of cotton between the mouth-pieces and the fillers.*—For this operation the machine is provided at the right-hand side of the series of tobacco-cases L with a stationary carding-comb, $l^8$, Figs. 1 and 3, a movable one, $l^9$, projecting above the former, and a drum, $c'$, upon which is wrapped a fleece of cotton, the said drum being arranged opposite to the projecting part of the face of the comb $l^9$ and pivoted to two movable arms, $c^2$, inclined toward the comb $l^9$, so that the drum bears with its cotton envelope against the same. The comb $l^9$ is connected to two levers, G, (one at either side of the machine,) operated by projections $h^7$ at the upper ends of the aforesaid bar $h^3$, the said projections acting on adjustable cam-pieces $l^{10}$, fixed to the levers G. When the bar $h^3$ moves to the left, the projections $h^7$, passing under the left-hand cam-pieces $l^{10}$, raise the comb $l^9$, whereas when the bar $h^3$ moves to the right the projections $h^7$ act in like manner on the right-hand cam-pieces $l^{10}$ and depress the said comb, which during its downward motion takes some cotton off the drum, the latter being prevented from rotating meanwhile by a ratchet-wheel and pawl. By the repeated motions of the comb $l^9$ and its co-operation with the comb $l^8$ the cotton is conveyed into the ends of the filler-molds extending under the said combs, and when the forks $k'$ are introduced into the holes $f$ of the block F for coiling the mouth-pieces these forks, being long enough to project with their points under the combs, twist the portions of the cotton opposite to them into plugs, which, by the receding motion of the forks, are drawn into the mouth-pieces, where they meet with sufficient resistance to be stripped off the forks.

*Introduction of the fillers and the mouth-pieces into the paper tubes and simultaneous removal of the said tubes from the filling-tubes.*—This operation is carried out by means of the driving-pins $o$, Figs. 3, 13, and 15, and the stripper $n'$, Figs. 1, 3, 11, and 12. The driving-pins $o$ are fixed in the bar K', integral with the carriage A, in such position that their center lines coincide with those of the filling-tubes $n$ and the filler-mold parts $l$. In the same lines the bar $K^0$ is provided with holes by which the pins are guided, and from which they are not entirely withdrawn when being in their extreme position to the right, as shown in Fig. 15. After the block F has been shifted, subsequent to the formation of the mouth-pieces, as hereinbefore described, and the holes $f$, containing the said mouth-pieces, have thereby been brought in a line with the completed fillers and the pins $o$, the latter are pushed forward by the motion of the carriage A to the left. In Fig. 15 the block F and the slide M are shown in their center position, which coincides with the extreme position to the right of the bar K', the holes $f$ being thus midway between the center lines of the forks $k'$ and the pins $o$. The pins by the said motion then press against the mouth-pieces, and through these on the fillers, and thus push both into the filling-tubes $n$ and out at the outer end thereof. As soon as the fillers begin to emerge from the tubes $n$ they expand and press round about against the paper tubes previously slipped on the tubes $n$, and which are somewhat longer than the latter, this pressure causing an amount of friction between the tobacco and the paper tubes, whereby the latter are drawn off the tubes $n$ in the measure as the fillers advance. The removal of the paper tubes from the tubes $n$ is promoted by the aforesaid stripper $n'$, consisting in a narrow plate having holes that correspond in diameter exactly with the outer diameter of the tubes $n$. The said plate is movable on the tubes $n$, and it is fixed at its ends to two rods, $n^2$, passing through eyes $n^3$ on the carriage A, and having two shoulders formed by rings, $n^4$, the said rings being so adjusted that when the carriage moves to the right respectively to Figs. 1 and 3, or to the left in Fig. 11, which is a view from the back of the carriage, the eyes $n^3$ will push the rods $n^2$ and the plate $n'$ backward against the bar N, so as to leave the tubes $n$ free for the paper tubes to be slipped upon the same, whereas when the carriage moves in the opposite direction the eyes $n^3$ will cause the plate $n'$ to be drawn forward on the tubes $n$ at the time the paper tubes are becoming filled and are pushed forward by the fillers, as described.

After the fillers and the mouth-pieces have been introduced into the paper tubes the cigarettes so far finished drop off the tubes $n$.

*Trimming the cigarettes.*—This operation is required only in case the cigarettes are filled with cut or fibrous tobacco, the fibers usually projecting more or less from the paper tubes. The mechanism by which the said operation is carried out consists in a reciprocating cutter, $v^2$, Figs. 1, 1$^b$, and 5, a transverse bar, $v$, fixed to standards $v'$ and having vertical holes corresponding to the diameter and length of the cigarettes, and a plate, $w$, arranged below the said holes and adapted to pivot on pins $w'$. The cutter $v^2$ has recesses $v^0$, semicircular at their bottom and beveled, so as to present cutting-edges, the said recesses registering with the holes in the bar $v$ and the cutter moving in close contact with the upper surface of the bar. The cutter is fixed to a frame, $v^3$, Figs. 1, 2, 5, and 14, operated by an eccentric, $v^4$, keyed on the shaft $b$ and engaged by means of a slide-block, $v^5$, in a transverse slot, $v^6$, of the frame. The cutter is thus moved to and fro longitudinally to the machine and transversely to its own length. The plate $w$ has an arm with a pin engaged by one arm of a lever, $w^3$, the other arm whereof extends into the path of the cutter and is acted upon by a spring, $w^2$, in the direction to keep the plate normally in horizontal position. The cigarettes on leaving the filling-tubes $n$ fall with their mouth-pieces foremost into funnels $u$, the tubular portions whereof, extending down to the cutter $v^2$, are in a line with the holes in the bar $v$. The cigarettes will thus drop into these holes and strike with their mouth-pieces on the plate $w$, whereby the tobacco is jolted together and the ends of the mouth-pieces are made even. The cutter then advances and cuts off the projecting fibers of tobacco, which drop on the plate $w$. The said plate is thereupon tilted by the cutter striking against the lever $w^3$, in consequence whereof the fibers, having been cut off, fall to the right, while the cigarettes drop down by the side of the left-hand edge of the plate, so that both may be collected in separate receptacles. Upon the return motion of the cutter the plate $w$ is brought back to its horizontal position by the spring $w^2$.

In order to render the operation of the machine still more clear, we shall in the following give a description thereof in a more condensed form, and at the same time introduce thereinto some observations which have not found a place in the foregoing.

When the carriage A is moving from its central position to the right, as supposed in the figures, the spindles $k$ are rotated for forming the mouth-pieces in the right-hand part of the machine, (not shown in the drawings,) the forks $k'$ at the left-hand end of the spindles being already completely withdrawn from the corresponding holes $f$ in the block F, while the driving-pins $o$ are receding. By the said motion of the carriage the bar $h^3$ is caused to move to the left through the medium of the spur-wheel $h'$ and the racks gearing therewith, so that the pieces $h^5$ and $h^7$, fixed to the bar $h^3$, operate, respectively, on the levers $h^4$ and G to raise the feeding-plate $g$ and the carding-comb $l^3$. At the same time the hooks $h^6$, secured to the bar $h^3$, are pushed into the slits between the cutters $e$ the feeders $l^2$ of the filler-making contrivance are being moved to and fro by means of the described mechanism, the paper cigarette tubes are slipped on the filling-tubes $n$ by the tube-conveyers $p'$ in co-operation with the guiding-pins $q$, and the stripper or plate $n'$ is pushed back on the tubes $n$. When the carriage A passes the turning-point at the right-hand end of its course, the plates $d^2 d^3$, with the system of strip-guiding plates $d d'$, and the block F, together with the slide M of the filler-making device, are shifted from the position shown in the drawings into the opposite position, their motion being downward relatively to Fig. 3 and to the left relatively to Fig. 5. The scrolls of paper previously formed in the alternate holes $f$ of the block F and provided with cotton plugs are thereby cut off from the strips $c$ and brought in register with the driving-pins $o$. The strips $c$ are besides cut off between the cutters $e$ and the plates $d d'$. The compressors, operating at the time to form fillers, are brought, with the tobacco above them under the upper parts, $l$, of the filler-molds, (so that the fillers are then also in a line with the pins $o$,) and the empty holes $f$ intermediate to the former are placed opposite to the forks $k'$. During the first part of the motion of the carriage to the left the spindles $k$ are pushed forward by means of the bar $k^4$, engaged in the notches of the same, the forks $k'$ being thereby introduced into the empty holes $f$, which are now about to receive the strips $c$. The piece $h^5$ by its motion to the left depresses the feeding-plate $g$, which thereby pushes the strips $c$ downward, and the hooks $h^6$ withdraw the waste pieces of paper from between the cutters $e$. After the spindles $k$, disengaged from the bar $k^4$, have come in contact with the bar $K^0$ they are rotated, in the manner hereinbefore set forth, to form mouth-pieces and cotton plugs. Meanwhile the driving-pins $o$ advance to push the finished fillers and mouth-pieces into the paper tubes on the tubes $n$, the tube-conveyers $p'$ recede from the latter, and the guiding-pins $q$ first recede also until they are clear of the tube receptacles $p$, and then advance again to pass into the paper tubes that have in the interval dropped to the bottom of the receptacles $p$. When the carriage is on the latter part of its course to the left, the plate $n'$ is operated to assist in the removal of the paper tubes from the filling-tubes, and the carding-comb $l^3$ is pushed down. The carriage thereupon changing its motion and going again to the right retracts the forks $k'$ and the driving-pins $o$, (the spindles $k$ having again been locked.) The guiding-pins $q$ advance farther until they reach the tubes $n$, the conveyers $p'$ push paper tubes onto the latter, and the spindles $k$ are again rotated for operating the forks at the right-hand end thereof. At the change of motion of the carriage from left to right there occurs, however, no shifting of the plates $d$ $d'$, the block F, and the slide M on account of the teeth $b^6$ being arranged on the wheel $b'$, opposite to the crank-pin $b^2$, operating the carriage; but as the pinion $i^5$ is rotated every time by half a revolution only the parts $d, d'$, F, and M will be moved alternately one way and the other at the successive passages of the carriage through its right-hand turning-point. The trimming of the cigarettes takes place immediately after they have dropped into the device provided therefor and the carriage has begun to move to the right.

*Closing the ends of the paper tubes to be filled with comminuted tobacco.*—In case the fillers are made of comminuted tobacco the paper tubes designed to receive the same have to be closed at their outer ends by folding the rim of the tubes inward and pinching the folds together. For this purpose the machine is provided for every cigarette to be made at one operation with a device shown in detail by Figs. $16^a$ and $16^b$. The same consists in a socket, $s'$, bored out conically at its outer end, a standard, $s$, having a boring into which the socket is inserted, a spring, $s^5$, placed between the bottom of the boring and a shoulder inside of the socket, and a pin, $s^2$, projecting from the said bottom into a hole in the center of the fore part of the socket. The said socket is normally in the position relatively to the standard $s$ as shown by Fig. $16^a$, so that the end of the pin $s^2$ forms the bottom of its conical boring and that it may slide backward a small distance within the standard until it touches with an outer shoulder against the same. The standards $s$ are formed upon and project upward from a bar, S, Figs. 19 and 21, placed transversely to the machine and movable lengthwise thereto in grooves on the frame B. After the paper tubes have been slipped on the filling-tubes $n$ and these have been brought in register with the sockets $s'$, in the manner to be described hereinafter, the bar S is pushed forward. Each socket in consequence presses with the face of its conical cavity against the rim of the paper tube opposite to it (the said rim projecting over the end of the filling-tube $n$) and bends it inward in folds, as shown by Fig. $16^a$. When the socket meets with a resistance at the tube $n$, it stops, while the standard $s$, on advancing farther, slides forward on the socket (the spring $s^5$ being compressed) and pushes the pin against the folds of the paper tube, whereby these are pressed or pinched together, as shown by Fig. $16^b$. The filler and the mouth-piece are then pushed into the tube in like manner, as hereinbefore set forth, the standard $s$ and the parts $s'$ and $s^2$ meanwhile receding in the measure as the filler advances, while they are kept in the relative position to each other and to the paper tube shown in Fig. $16^b$, in order that the latter remain closed while being drawn off the filling-tube $n$.

The standards $s$ are so arranged as that the sockets $s'$ are in a line with the driving-pins $o$ and with the upper parts, $l$, of the filler-molds, whereas the guiding-pins $q$, the tube-conveyers $p'$, and the tube-receptacles $p$ are in line with the forks $k'$. The bar N, carrying the filling-tubes, is fixed to the aforesaid slide M, and consequently moves together with the same, and it is provided with two sets of the said tubes $n$ and $n^0$, having such position that by the motion of the bar N they are brought alternately opposite to the tube-conveyers $p'$ for being supplied with paper tubes and to the sockets $s'$ for being closed at the ends.

In order that the paper tubes be completely slipped on the filling-tubes before they are moved sidewise, (the said motion taking place when the carriage A is at the right-hand end of its course, as described,) the bar P, carrying the conveyers $p'$, is connected to the carriage by means of two arms, $p^5$, passing through holes of a transverse rib of the carriage and prevented from slipping out of the same by cotters $p^8$, and on the arms are placed springs $p^6$, adapted to push the bar P forward relatively to the carriage. Moreover, a rod, $p^4$, extends from the bar through an eye, $p^7$, at the lower end of the pin $r^3$, connecting together the levers $r^4$ and the bar R, the said rod being provided at its outer end with a ring, $p^3$, forming a shoulder. The ring $p^3$ is so adjusted as that it will strike against the eye $p^7$ a short time before the carriage has arrived at the end of its course to the right, the eye being at the time at rest on account of the bar R having previously been stopped by its contact with the end surfaces, $r'$, of its guiding-slits, as hereinbefore described. When the ring $p^3$ strikes against the eye $p^7$, the bar P is stopped, while during the remaining part of the motion of the carriage to the right the springs $p^6$ are compressed. When the carriage goes to the left again, the springs $p^6$ first expand, and then the carriage draws the bar back by means of the pins $p^8$ and the arms $p^5$.

The mechanism for operating the tube-closing device comprises two elbow-levers, $t'$, Figs. 16, 17, $17^a$, 18, 19, 21, and 23, pivoted to the frame B; two cam pieces, $t^2$, fixed to the carriage A; two rods, $t^3$, pivoted to the bar S and maintained by a supporting-surface in horizontal position; two pins, $p^0$, fixed to the bar P; two cam-pieces, $t^4$, screwed to the edge of the carriage A; two levers, $t^5$, pivoted to the carriage and kept in vertical position by the preponderance of weight of their lower arms; two tappets, $t^6$, fixed to the frame B; a bar, $s^4$, sunk into a groove at the bottom of the bar S and having rollers, by means whereof it is supported on the edges of the carriage; pins $s^3$, passing from the bar $s^4$ toward the sockets $s'$, and resilient pieces $s^6$, Figs. 23, $16^a$, and $16^b$, preferably of india-rubber, inserted between the pins $s^3$ and the sockets. When the carriage is in the middle of its course to the right, the bar S, the parts co-operating therewith, and the mechanism for slipping the paper tubes on the filling tubes are in the position shown by Figs. 16, 18, and 19. The guiding-pins $q$ and the tube-conveyers $p'$ are advancing to push paper tubes on the filling-tubes $n$ opposite to them. In Fig. 17 the carriage is at the right-hand end of its course, the tube-conveyers are in their most advanced position, the pins $q$ are receding, the pins $p^0$ on the bar P have pushed the bar S forward a certain distance, and the tubes $n$ supplied with paper tubes are about to be shifted in register with the sockets $s'$. After the latter operation has been completed in the manner described and the carriage moves to the left, as in Fig. 17$^a$, the cam-pieces $t^2$, on passing with their inclined surfaces $t^7$ under the rollers at the ends of the lower arms of the levers $t'$, cause the upper arms of these levers to press against the rods $t^3$, and thereby to push the bar S, with the sockets $s'$, against the paper tubes. At the same time the cam-pieces $t^4$ pass under the rollers at the ends of the bar $s^4$, thereby raising the latter, and when the cam-pieces $t^2$ allow the levers $t'$ to release the rods $t^3$, and consequently the bar S, the shoulders on the cam-pieces $t^4$ bearing against the rollers of the bar $s^4$, cause the bar S, together with the sockets $s'$, to be moved backward in the measure as the paper tubes are being filled. During this backward motion, and until the cigarette has been finished, the sockets $s'$ are maintained in their retracted position within the standards $s$ by the cam-pieces $t^4$ pressing, through the medium of the bar $s^4$ and the pins $s^3$, the pieces $s^6$ against the sockets, the purpose hereof being to prevent the springs $s^5$ from prematurely pushing the sockets forward again and thereby bending the cigarettes. When the filling is completed, the lower arms of the levers $t^5$, on coming in contact with the tappets $t^6$, cause the upper arms of the said levers to quickly push the bars $s^4$ and S off the cam-pieces $t^4$, as shown in Fig. 23, the rods $t^3$ passing away over the upper arms of the levers $t'$. The finished cigarettes are then free to drop off the tubes $n$, and the sockets $s'$, released from the pressure of the pieces $s^6$, resume their normal position in the standards $s$. Upon the carriage again moving to the right the levers $t'$ are first raised by the cam-pieces $t^2$, but without their acting on the bar S, because the rods $t^3$, being at the time projected past the levers, will only be lifted by the latter and then allowed to drop again. The tubes $n^0$, being now in register with the tube-receptacles, are then supplied with paper tubes. The bar N and parts connected therewith are shifted back to the position shown in Fig. 1$^a$, and the operation is repeated.

We claim as our invention—

1. The combination of the sliding carriage A with bar K', spindles $k$, passing through holes in the bar K' and having helicoidal grooves and the notches $k^3$, pins $k^2$, projecting from the bar K' into the said grooves, the bar $k^4$, inserted into the bar K' and adapted to engage in the notches $k^3$, the stationary cam-pieces $k^6$, and springs $k^5$, acting on the bar $k^4$, forks $k'$, fixed to the spindles $k$, block F, having holes $f$ slitted at the top, guiding-plates $d$ $d'$, feeding-plate $g$, with india-rubber tongues $g^2$, mechanism for moving the plate $g$ up and down, and the plate $g^4$, fixed to the plates $d$ $d'$ and provided with india-rubber tongues $g^5$, all co-operating substantially as and for the purpose described.

2. The combination of the guide-plates $d$ $d'$, the block F, having holes $f$ slitted at the top, the stationary cutters $e$, and mechanisms for moving the plates $d$ $d'$ and the block F to and fro, substantially as and for the purpose specified.

3. The combination of the sliding carriage A, provided with the racks $h$, the cutters $e$, having slits between them, the spur-wheels $h'$, the racks $h^2$, with bar $h^3$, and the hooks $h^6$, fixed to the bar $h^3$ and adapted to pass into the said slits, substantially as and for the purpose set forth.

4. The combination of the sliding carriage A, the tobacco-cases L, the stationary filler-mold parts $l$, the feeders $l^2$, having teeth at their ends, the racks $l^3$, engaging therewith, the slide M, having slits containing the compressors $m$ and $m^9$, the frames $m^4$ $m^9$ and $m^5$ $m^{10}$, having projections engaging in notches of the alternate compressors, the cam-pieces $m^6$ $m^7$, engaging the parts $m^9$ and $m^{10}$ of the said frames between them, and mechanism for transmitting reciprocating motion from the carriage to the racks $l^3$ and the slide M, substantially as and for the purpose described.

5. The combination of the sliding carriage A with bar K', spindles $k$, passing through holes in the bar K' and having helicoidal grooves and the notches $k^3$, pins $k^2$, projecting from the bar K' into the said grooves, the bar $k^4$, inserted into the bar K' and adapted to engage in the notches $k^3$, the stationary cam-pieces $k^6$, and springs $k^5$, acting on the bar $k^4$, forks $k'$, fixed to the spindles $k$, block F, having holes $f$ slitted at the top, the drum $c'$, pivoted to swinging arms $c^2$ and provided with a ratchet-wheel engaged by a pawl, the stationary carding-comb $l^8$, and the vertically-reciprocating carding-comb $l^9$, substantially as and for the purpose specified.

6. The combination of the frame B with guiding-plates R', sliding carriage A, the filling-tubes $n$, the tube-receptacles $p$, the guiding-pins $q$, the bar Q, carrying the guiding-pins, the levers $r^4$, the bar R, the tube-conveyers $p'$, and the driving-pins $o$, substantially as and for the purpose set forth.

7. The combination, with the sliding carriage A, having eyes $n^3$, and with the tubes $n$, of the stripping-plates $n'$, having the rods $n^2$ passing through the said eyes and provided with the collars $n^4$, substantially as and for the purpose described.

8. The combination of the stationary bar $v$, having vertical holes, the cutter $v^2$, having beveled and sharpened recesses registering with the said holes, shaft $b$, with eccentric $v^4$, frame $v^3$, to which the cutter $v^2$ is fixed, plate $w$, journaled on pivots $w'$, lever $w^3$, spring $w^2$, and funnels $u$, substantially as and for the purpose specified.

9. The combination of the filling tubes $n$ $n^0$, bar S, with standards $s$ and rods $t^3$, sockets $s'$, pins $s^2$, springs $s^5$, bar $s^4$, pins $s^3$, resilient pieces $s^6$, sliding carriage A, with cam-pieces $t^2$ and $t^4$, levers $t'$ and $t^5$, fixed tappet $t^6$, and bar P, with pins $p^0$, substantially as and for the purpose set forth.

In testimony whereof we have hereunto set our hands in the presence of two subscribing witnesses.

EMIL ARMAND KJÖLLERFELDT.
WLADISLAV KOLNOTSCH.

Witnesses:
  OTTO LUCANDER,
  A. PRINTZ.